Sept. 23, 1930.   J. J. R. McLOUGHLIN   1,776,291
AUTOMOBILE ACCESSORY
Filed Nov. 27, 1929   2 Sheets-Sheet 1
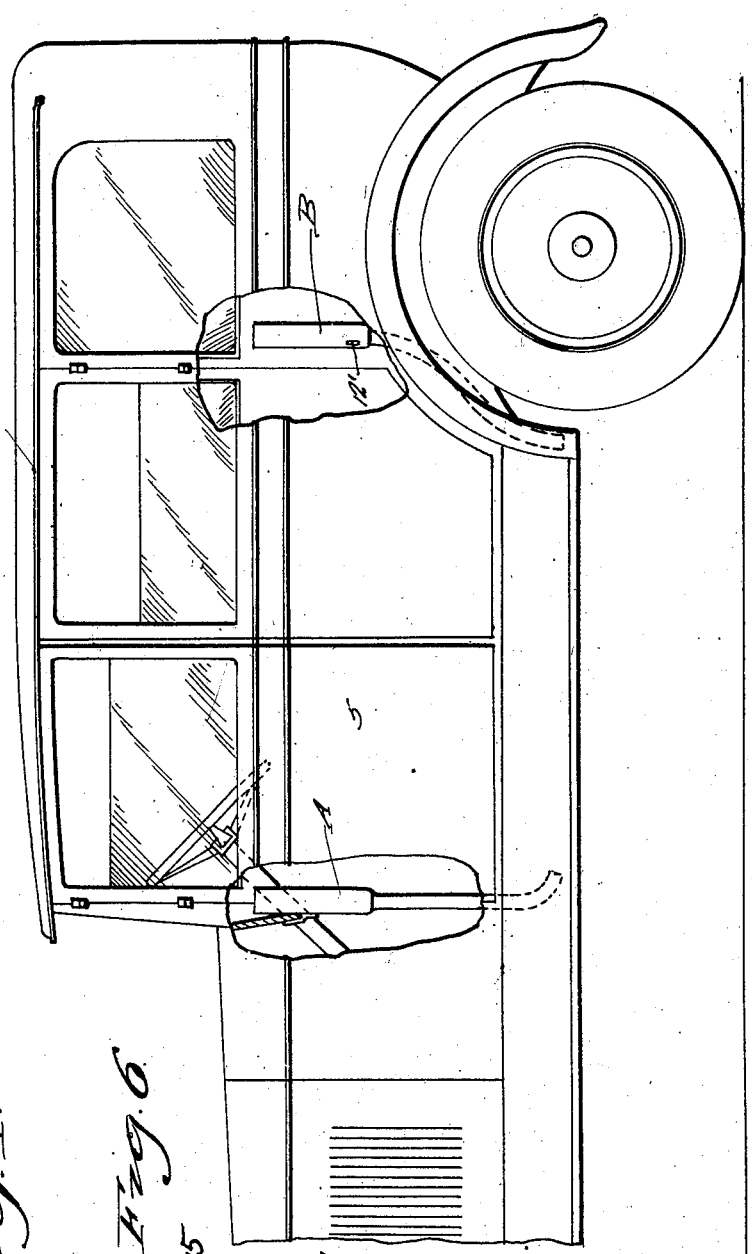
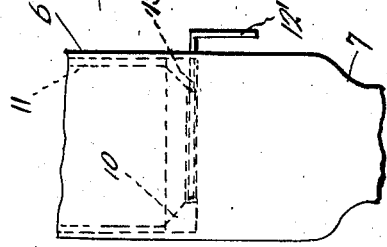
Inventor
James J. R. McLoughlin
By Clarence A. O'Brien
Attorney

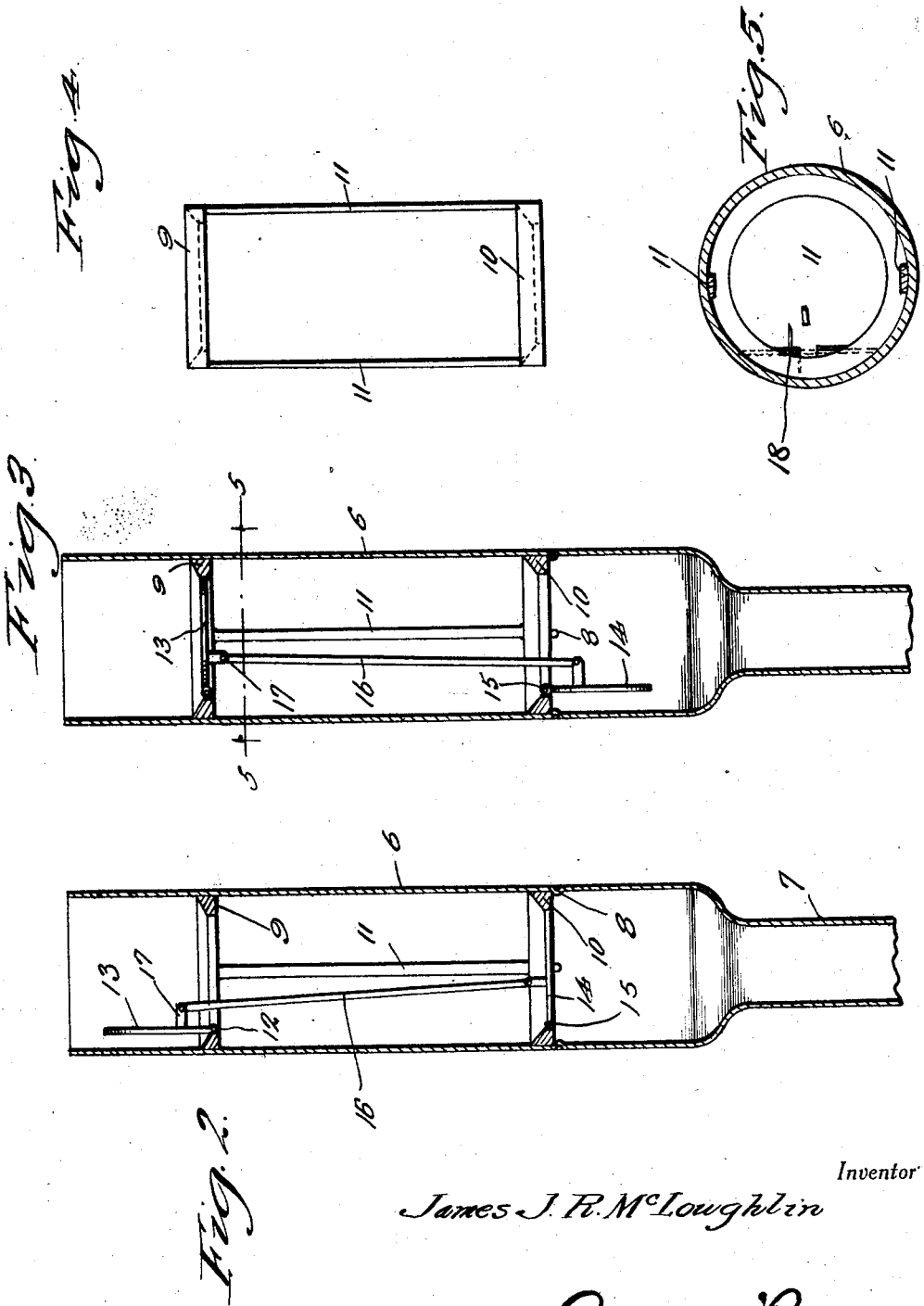

Patented Sept. 23, 1930

1,776,291

UNITED STATES PATENT OFFICE

JAMES J. R. McLOUGHLIN, OF POLAND, NEW YORK

AUTOMOBILE ACCESSORY

Application filed November 27, 1929. Serial No. 410,083.

The present invention relates to an automobile accessory and has for its prime object to provide a receptacle for cigarette and cigar butts, ashes, matches, and other waste material.

Another very important object of the invention resides in the provision of a device of this nature having a pair of valves interconnected so that when one is closed the other is open and vice versa for the purpose of preventing any of the waste material from blowing into the car when it is desired to empty the receptacle.

A still further very important object of the invention resides in the provision of an accessory of this nature which is exceedingly simple in its construction, inexpensive to manufacture, and install, strong and durable, easy to manipulate, efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a fragmentary side elevation of an automobile showing parts of the body broken away and illustrating the locations of the accessories in the body, Figure 2 is a vertical section through one of the receptacles with the top valve open and the bottom valve closed, Figure 3 is a similar section with the top valve closed and the bottom valve open, Figure 4 is a detail side elevation of the valve seats with their interconnecting rods, Figure 5 is a horizontal section taken substantially on the line 5—5 of Figure 3, and Figure 6 is a fragmentary elevational view for more clearly illustrating the manual means for operating the valves.

Referring to the drawing in detail it will be seen that the numeral 5 denotes an automobile body illustrating my accessories A and B located therein in convenient position but of course other locations may be utilized.

Each accessory comprises a tubular body portion 6 merging at its lower end into a fixed outlet tube 7 which may be curved to meet the necessities of insulation. The lower portion of the tubular body 6 is provided with indents 8 or the like forming shoulders.

A pair of rings 9 and 10 are connected in spaced relation by means of rods 11 so that the rings and rods may be inserted into the tubular body as a unit and the ring 10 will rest on the indents 8. These rings form valve seats, a flat valve 13 being hingedly mounted as at 12 in the ring 9 and a similar valve 14 hingedly mounted as at 15 in the ring 10.

A connecting rod 16 is pivotally connected with lugs 17 on the valves 13 and 14 so that when one valve is closed another valve is open and vice versa. It will be apparent from a consideration of Figures 2 and 3, that the upper valve 13 opens upwardly while the lower valve 14 opens downwardly.

A spring 18 is incorporated in the hinge structure 12 so as to normally hold the valve 13 in an open position thereby normally holding the valve 14 in a closed position; and the hinge structure 15 is further provided exteriorly of the tube 6 with a handle or actuating member 12' whereby the valves 13 and 14 may be actuated manually and simultaneously. When sufficient waste material such as cigarettes, cigar butts, match stems, ashes and the like have been inserted into the body 6 to rest on the valve 14 to overcome the spring 18 it will be seen that the valve 14 will gravitate down to an open position thereby causing the valve 13 to close.

This action is very important because it eliminates the annoyance of a back draft blowing waste material inside the car. It will further, of course, be readily understood that it is not necessary to wait until a particular amount of waste material has accumulated in the body 6 to empty the same because the valve 11 may be manually swung to an opened position thereby causing the closing of the valve 13.

It will further be seen that the valve units may be readily removed when it is desired to thoroughly clean the receptacle or to repair any of the movable parts thereof.

It is thought that the construction, operation, utility and advantages of this invention will now be quite apparent to those skilled in this art without a more detailed description thereof.

It is apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A device of the class described comprising a tubular body, a pair of rings mounted in the tubular body one above the other, a valve hingedly mounted in the upper ring, a valve hingedly mounted in the lower ring, a connecting rod operatively engaged with the valves so that when one valve is open the other valve is closed, said lower valve being openable downwardly and said upper valve being openable upwardly, rods connecting the rings, said tube having a shoulder on which the lower ring rests.

2. An ash receptacle comprising a tubular body, a pair of upper and lower rings mounted in the tubular body in vertical spaced alinement, a valve hingedly mounted in the upper ring, a valve hingedly mounted in the lower ring, spring means for normally retaining the valve in said upper ring in an opened position, a connecting rod pivotally engaged with said valves whereby when the upper valve is in an open position the lower valve will be in a closed position, said upper valve opening upwardly, and said lower valve opening downwardly, said lower valve adapted to be actuated under the weight of material resting thereon for simultaneously actuating said valves.

3. In an ash receptacle for vehicles, a tubular body open at its top and bottom and adapted to be mounted vertically interiorly of a vehicle, the lower end of said body projecting thru the floor of the vehicle, said body being provided with an internal shoulder formed thereon intermediate the ends of the body, a valve unit for disposition within said body, said valve unit comprising a pair of upper and lower vertically spaced alined valve seats, rods connecting said valve seats, one of said valve seats adapted to rest on said shoulder for supporting the valve unit within said tubular body, a disk valve hinged in each of said valve seats, a connecting rod operatively engaged with the valves for simultaneously actuating said valves, and spring means engaging one of said valves for normally retaining said one valve in an opened position and the other valve in a closed position.

4. In an ash receptacle for vehicles, a tubular body opened at its top and bottom and adapted to be mounted vertically interiorly of a vehicle, with the lower end of said body projecting through the floor of the vehicle, a valve unit for disposition within said body, means for mounting said valve unit within said body, said valve unit comprising a pair of vertically spaced upper and lower alined valve seats, rods connecting said valve seats, a disk valve hinged in each of said valve seats, a connecting rod operatively engaged with the valves for simultaneously actuating said valves, spring means engaging one of said valves for normally retaining said one valve in an open position and the other valve in a closed position, the said normally closed valve adapted to be actuated for movement to an open position against the action of said spring under weight of the material supported thereon, and manually controlled means operatively engaged with one of said valves for simultaneously actuating said valves.

In testimony whereof I affix my signature.

JAMES J. R. McLOUGHLIN.